US012224487B1

(12) United States Patent
Dawson

(10) Patent No.: US 12,224,487 B1
(45) Date of Patent: Feb. 11, 2025

(54) METHOD AND APPARATUS FOR CONNECTION AND DEPLOYMENT OF TRAILING WIRE ANTENNAS

(71) Applicant: United States of America as represented by the Secretary of the Navy, San Diego, CA (US)

(72) Inventor: David Carlos Dawson, Lemon Grove, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 73 days.

(21) Appl. No.: 18/366,542

(22) Filed: Aug. 7, 2023

(51) Int. Cl.
*H01Q 1/30* (2006.01)
*H01Q 1/28* (2006.01)

(52) U.S. Cl.
CPC ................. *H01Q 1/30* (2013.01); *H01Q 1/28* (2013.01)

(58) Field of Classification Search
CPC ............... H01Q 1/30; H01Q 1/28; H01Q 1/29
See application file for complete search history.

(56) References Cited

U.S. PATENT DOCUMENTS 2,137,450 A 11/1938 Green
2,187,575 A 1/1940 Schroeder
2,272,213 A 2/1942 Lear
2,986,733 A 5/1961 Trilling
3,134,951 A 5/1964 Huber
3,496,567 A 2/1970 Held
3,499,171 A 3/1970 Carrel
4,278,955 A 7/1981 Lunden
5,326,040 A * 7/1994 Kramer .................... H01Q 1/30 242/418
7,154,430 B1 12/2006 Buehler et al.

* cited by examiner

*Primary Examiner* — Dimary S Lopez Cruz
*Assistant Examiner* — Austin M Back
(74) *Attorney, Agent, or Firm* — Naval Information Warfare Center, Pacific; Kyle Eppele; J. Eric Anderson

(57) ABSTRACT

A trailing wire antenna connector comprising: a spool; a trailing line and a conductive socket. The trailing line is configured to be wound around the spool and consists of a non-conductive line segment joined to a conductive wire segment via a conductive plug. The non-conductive line segment is connected to the spool. The conductive socket is configured to be mounted to a fuselage so as to be electrically insulated from the fuselage and electrically connected to a feed line of an RF receiver. The conductive socket has an opening through which the conductive wire segment may pass but that is too small for the conductive plug to pass such that when the conductive plug comes into contact with the conductive socket the conductive wire segment is electrically connected to the feed line.

20 Claims, 4 Drawing Sheets

METHOD AND APPARATUS FOR CONNECTION AND DEPLOYMENT OF TRAILING WIRE ANTENNAS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 210338.

BACKGROUND OF THE INVENTION

Long wire antennas may be used for frequency ranges where the wavelength is electrically long compared to the structures and platform that transmits them. In the electromagnetic spectrum, high frequency (HF) antennas and below often fall within this category. Trailing wire antennas have been used on some platforms to enable communications in frequency ranges having long wavelengths. There is a need for an improved way of connecting such trailing wires to a moving platform.

SUMMARY

Disclosed herein is a trailing wire antenna connector comprising: a spool, a trailing line and a conductive socket. The trailing line is configured to be wound around the spool and consists of a non-conductive line segment joined to a conductive wire segment via a conductive plug. The non-conductive line segment is connected to the spool. The conductive socket is configured to be mounted to a fuselage so as to be electrically insulated from the fuselage and electrically connected to a feed line of an RF receiver. The conductive socket has an opening through which the conductive wire segment may pass but that is too small for the conductive plug to pass such that when the conductive plug comes into contact with the conductive socket the conductive wire segment is electrically connected to the feed line.

The trailing wire antenna connector is also described herein as comprising a conductive socket, a conductive wire, a conductive plug, and a non-conductive line. The conductive socket has a wide opening on a first end and a narrow opening on an opposite end. The conductive socket is physically connected to, and electrically insulated from, a fuselage such that the wide opening faces the fuselage. The conductive socket is electrically connected to a feed line of a transceiver and the fuselage functions as an electrical ground. The conductive wire has a distal end and a proximal end and is capable of resonating at a desired frequency. The conductive wire has a cross-sectional profile small enough to pass through the narrow opening. The conductive plug is electrically and physically connected to the proximal end of the conductive wire and sized to fit through the wide opening but not fit through the narrow opening of the conductive socket. The non-conductive line has a distal end that is connected to the conductive plug opposite the conductive wire. The non-conductive line, the conductive plug, and the conductive wire are configured to be wound around a fuselage-mounted spool such that, when the fuselage is in flight, the non-conductive line, the conductive plug, and the conductive wire may be unspooled with the conductive wire passing through the narrow opening until the conductive plug comes into contact, and forms an electrical connection, with the conductive socket thereby forming a trailing wire antenna.

A method for providing a trailing wire connector is described herein as comprising the following steps. The first step provides for mounting a conductive socket to a fuselage such that the conductive socket is electrically insulated from the fuselage. Another step provides for electrically connecting the conductive socket to a feed line of an RF cable. Another step provides for electrically connecting a metal shield of the RF cable to the fuselage. Another step provides for winding a trailing line around a spool and mounting the spool to the fuselage. The trailing line comprises a non-conductive line segment separated from a conductive wire segment by a conductive plug, which is electrically and physically connected to a proximal end of the conductive wire and sized to not fit through an opening of the conductive socket. Another step provides for unspooling the trailing line through the opening of the conductive socket until the conductive plug comes into contact with the conductive socket creating an electrical connection between the conductive socket and the conductive plug thereby forming a trailing wire antenna.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
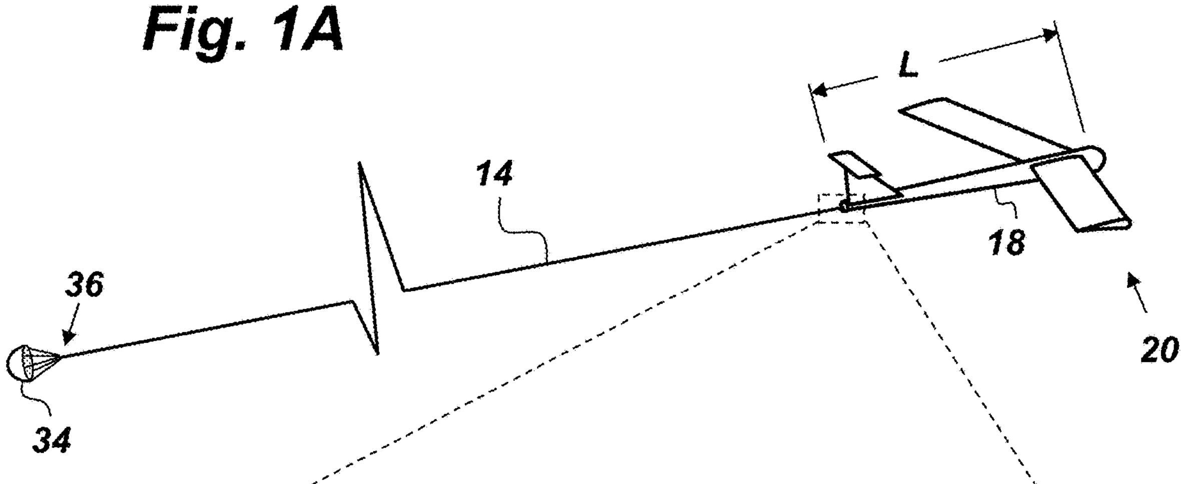
FIG. 1A is a perspective view illustration of an embodiment of a trailing wire connector mounted to a UAV.

FIG. 1 is a perspective view illustration of an embodiment of a trailing wire connector 10 that comprises, consists of, or consists essentially of a spool 12, a trailing line 14, and a conductive socket 16. The trailing wire connector 10 is configured to be mounted to a fuselage 18 of a mobile platform such as the unmanned aerial vehicle (UAV) 20 shown in FIG. 1A. The trailing line 14 consists of a non-conductive line segment 22 joined to a conductive wire segment 24 via a conductive plug 26. The non-conductive line segment 22 is connected to the spool 12, which in this embodiment is mounted within the fuselage 18. The conductive socket 16 is configured to be mounted to the fuselage 18 so as to be electrically insulated from the fuselage 18. The conductive socket 16 is also electrically connected to a feed line 28 of a radio frequency (RF) receiver 29. The fuselage 18 may also be connected to the RF receiver to function as a ground. For example, the conductive socket 16 may be connected to the center conductor of an RF cable and the fuselage 18 may be connected to the metal shield of the RF cable. The conductive socket 16 has an opening 30 through which the conductive wire segment 24 may pass. However, the opening 30 is too small for the conductive plug 26 to pass such that when the conductive plug 26 comes into contact with the conductive socket 16, the conductive wire segment 24 is electrically connected to the feed line 28.

Figure 1B:
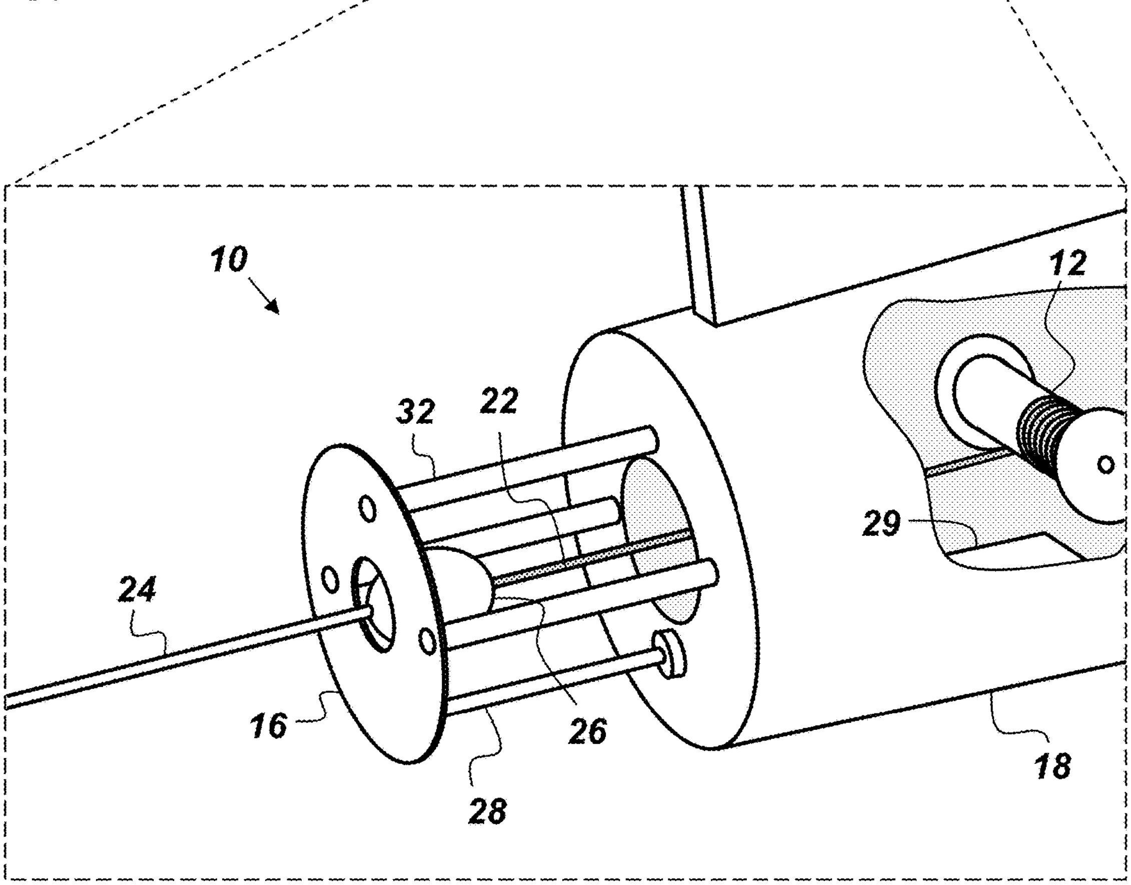
FIG. 1B is a magnified, sectional view illustration of an embodiment of a trailing wire connector.
Figure 2A:
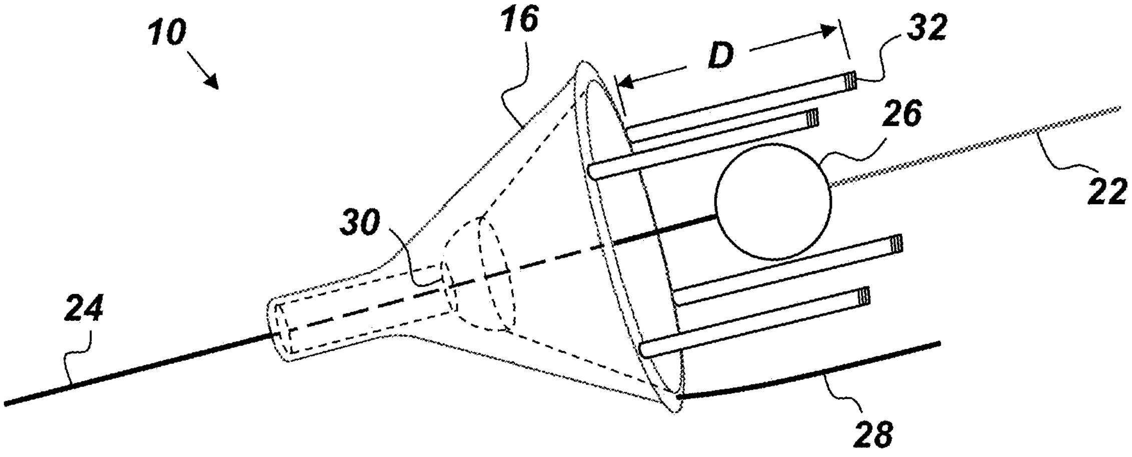
FIG. 2A is a perspective view illustration of an embodiment of a trailing wire connector.
Figure 2B:
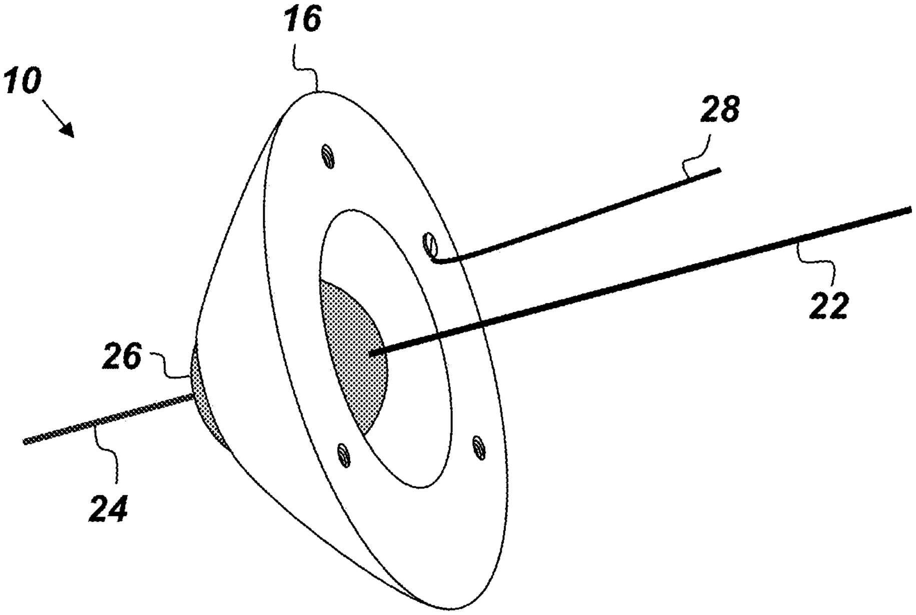
FIG. 2B is a perspective view illustration of an embodiment of a trailing wire connector.

FIGS. 2A and 2B are perspective view illustrations of different embodiments of the trailing wire connector 10. FIG. 2A is a transparent, perspective view of a funnel-shaped embodiment of the conductive socket 16. FIG. 2B is a perspective view of a truncated cone embodiment of the conductive socket 16 where the conductive plug 26 is a sphere such that when in full contact, the conductive socket 16 and the conductive plug 26 form a ball joint to allow for some movement of the conductive wire segment 24 with respect to the UAV 20. FIGS. 1B and 2A show non-conductive bolts 32 to allow for physical connection along with electrical insulation between the conductive socket 16 and the fuselage 18. The distance D between the conductive socket 16 and the fuselage 18 may be any desired distance provided that electrical insulation is maintained between the conductive socket 16 and the fuselage 18. The conductive socket 16 may be made of any conductive material that is strong enough to support the conductive wire segment 24. In FIG. 1B, the conductive socket 16 is a flat metal plate attached to the fuselage 18 with non-conductive bolts 32. As shown in FIG. 1A, in some embodiments, a drogue parachute 34 may be connected to a free end 36 of the conductive wire segment 24. Alternatively, a weight (such as weight 38 shown in FIG. 3A may be attached to the free end 36. The conductive plug 26 may be made of any conductive material and may have any desired shape (e.g., spherical, conical, ovoidal, etc.) that when mated with the conductive socket 16 establishes an electrical connection between the conductive plug 26 and the conductive socket 16. The conductive plug 26 may be connected to the conductive wire segment 24 and the non-conductive line segment 22 by one or more of any suitable means (e.g., set screws, crimping, welding, fasteners, adhesives, etc.) that provides a secure connection.

The trailing wire connector 10 may be used to enable the UAV 20 to communicate in frequencies where the corresponding wavelength is many times longer than the length L of the fuselage 18. The long conductive wire segment 24 is attached to one side of the conductive plug 26. The opposite side of the conductive plug 26 is physically connected to the non-conductive line segment 22, which has a proximal end that is attached to a drum, or spool system such as the spool 12 shown in FIG. 1B. Unspooling the trailing line 14 starts by rolling the spool 12 until the conductive plug 26 mates with the conductive socket 16. The drogue parachute 34 or other air resistance device attached to the free end 36 can also provide positive tension while the trailing line 14 is unspooled.

Figure 3A:
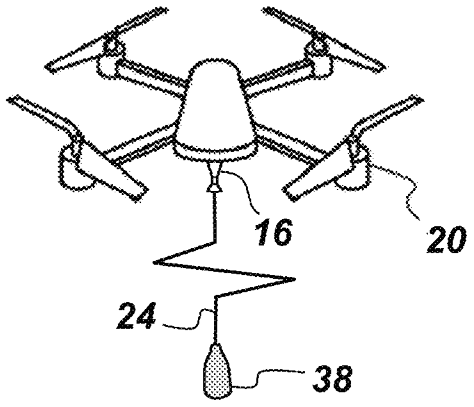
FIG. 3A is a perspective view illustration of an embodiment of a trailing wire connector mounted to a UAV.
Figure 3B:
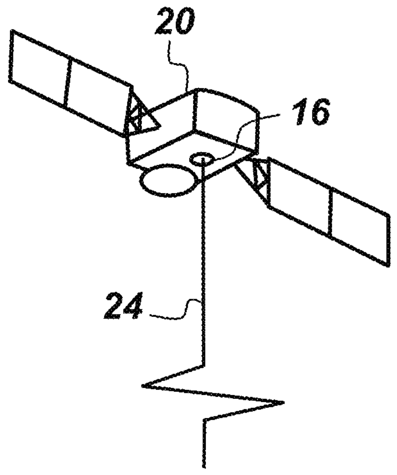
FIG. 3B is a perspective view illustration of an embodiment of a trailing wire connector mounted to a UAV

FIGS. 3A and 3B are perspective-view illustrations of different embodiments of the UAV 20, to which the trailing wire connector 10 may be mounted. FIG. 3A shows the trailing wire connector 10 mounted to a quadcopter drone. FIG. 3B shows the trailing wire connector mounted to a satellite. The trailing line 14 may be retrieved by spooling the non-conductive line segment 22, followed by the conductive plug 16, and then followed by the conductive wire segment 24. Spooling can continue for a predetermined number of rotations of the spool 12, or a mechanical or optical sensor may be used to stop the spooling once the trailing line 14 is sufficiently spooled. When unspooled and played out of the conductive socket 16, the conductive wire segment 24 may have a horizontal or vertical orientation. In the embodiment of the trailing wire connector 10 shown in FIG. 3A, the trailing line may be lowered straight down below the UAV 20, where gravity provides the force required to keep the conductive plug 26 in electrical contact with the conductive socket 16. The conductive wire segment 24 may be operatively connected to an antenna coupler or automatic tuner. While a specific frequency might be optimal based on the length of the conductive wire segment 24 and the fuselage 18, the trailing wire connector 10 may be used with a broad band of frequencies. This optimal frequency, or desired frequency, could have a wavelength somewhere between a quarter and a half longer than the combined length of the conductive wire segment 24 plus the fuselage 18. The idea is to get a combined length (i.e., conductive wire segment 24+fuselage 18) of about a quarter wavelength of the center frequency, or optimal frequency to support transmission (via a couple or tuner) of the entire band. It does not necessarily have to be the exact center of the frequency band.

Figure 4:
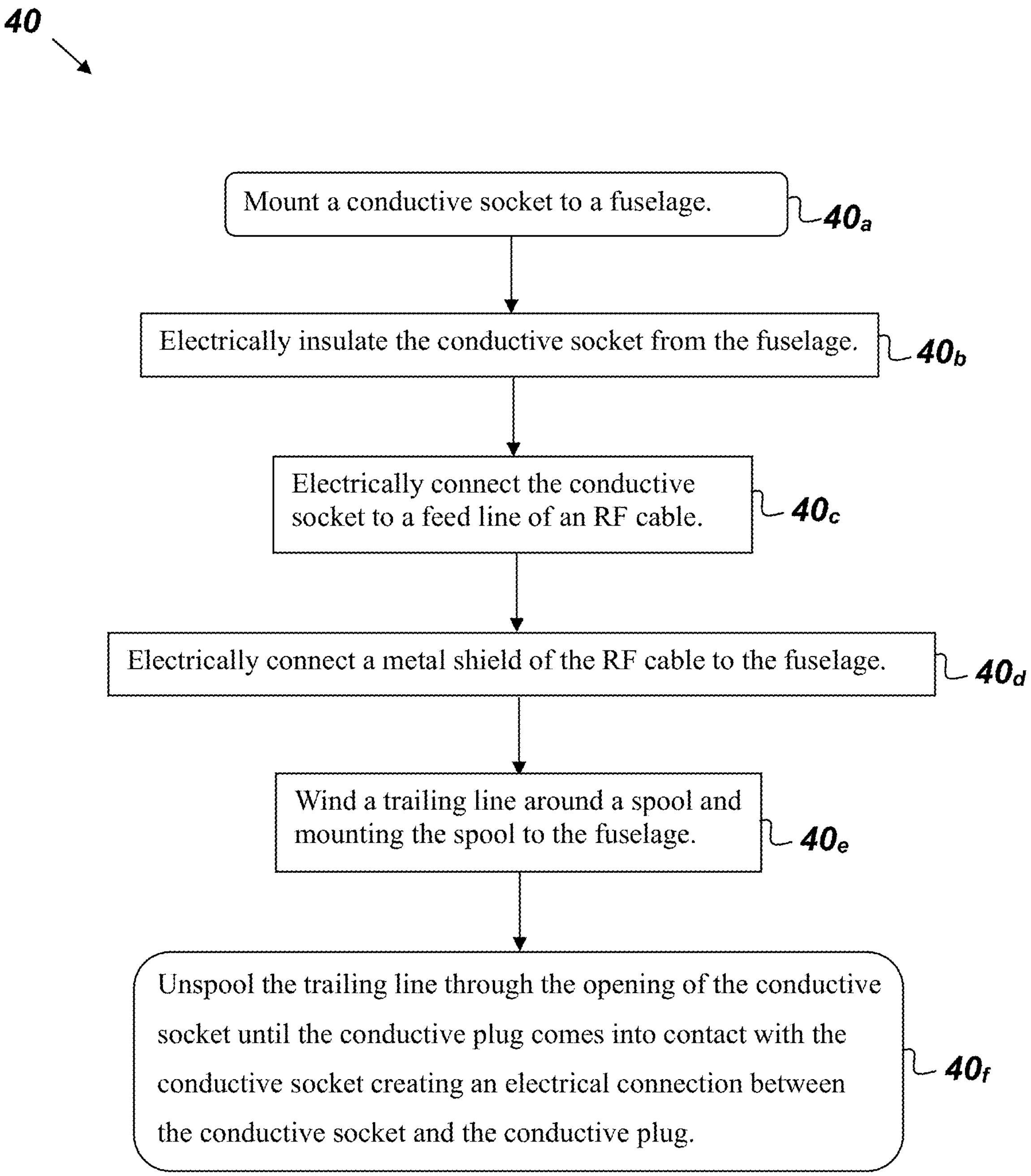
FIG. 4 is a flowchart.

FIG. 4 is a flowchart of a method 40 for providing a trailing wire connector comprising the following steps. The first step $40_a$ provides for mounting a conductive socket to a fuselage. The conductive socket has opening therein. Another step $40_b$ provides for electrically insulating the conductive socket from the fuselage. Another step $40_c$ provides for electrically connecting the conductive socket to a feed line of an RF cable. Another step $40_d$ provides for electrically connecting a metal shield of the RF cable to the fuselage. Another step $40_e$ provides for winding a trailing line around a spool and mounting the spool to the fuselage. The trailing line comprises a non-conductive line segment separated from a conductive wire segment by a conductive plug. The conductive plug is electrically and physically connected to a proximal end of the conductive wire and sized to not fit through the opening of the conductive socket. Another step $40_f$ provides for unspooling the trailing line through the opening of the conductive socket until the conductive plug comes into contact with the conductive socket creating an electrical connection between the conductive socket and the conductive plug. The unspooling may be done while the fuselage is airborne, thereby forming a trailing wire antenna. The trailing line may be retracted within the fuselage and rewound on the spool prior to landing. Alternatively, the trailing line may be left unspooled and, in addition to being used as an antenna, may be used to snatch the UAV out of the air by grasping the conductive wire segment.

From the above description of the trailing wire connector 10, it is manifest that various techniques may be used for implementing the concepts of the trailing wire connector without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the trailing wire connector 10 is not limited to the particular embodiments described herein, but is capable of many embodiments without departing from the scope of the claims.

I claim:

1. A trailing wire antenna connector comprising:

a spool;

a trailing line configured to be wound around the spool, wherein the trailing line consists of a non-conductive line segment joined to a conductive wire segment via a conductive plug, and wherein the non-conductive line segment is connected to the spool; and a conductive socket configured to be mounted to a fuselage so as to be electrically insulated from the fuselage and electrically connected to a feed line of an RF receiver, wherein the conductive socket has an opening through which the conductive wire segment may pass but that is too small for the conductive plug to pass such that when the conductive plug comes into contact with the conductive socket the conductive wire segment is electrically connected to the feed line.

2. The trailing wire antenna connector of claim 1, wherein the spool is mounted within the fuselage.

3. The trailing wire antenna connector of claim 2, further comprising a drogue parachute connected to a free end of the conductive wire segment.

4. The trailing wire antenna connector of claim 2, wherein the conductive socket is a flat metal plate attached to the fuselage with non-conductive bolts.

5. The trailing wire antenna of claim 4, wherein the conductive plug has a conical shape.

6. The trailing wire antenna connector of claim 2, wherein the conductive socket is funnel-shaped.

7. The trailing wire antenna connector of claim 2, further comprising an antenna coupler operatively connected to the conductive socket.

8. The trailing wire antenna connector of claim 1, wherein the feed line is a center conductor of an RF coaxial cable and the fuselage is electrically connected to a conductive shield of the RF coaxial cable.

9. A trailing wire connector comprising:

a conductive socket having a wide opening on a first end and a narrow opening on an opposite end, wherein the conductive socket is physically connected to, and electrically insulated from, a fuselage such that the wide opening faces the fuselage, and wherein the conductive socket is electrically connected to a feed line of a transceiver and the fuselage functions as an electrical ground;

a conductive wire having a distal end and a proximal end, wherein the conductive wire is capable of resonating at a desired frequency, and wherein the conductive wire has a cross-sectional profile small enough to pass through the narrow opening;

a conductive plug electrically and physically connected to the proximal end of the conductive wire and sized to fit through the wide opening but not fit through the narrow opening of the conductive socket;

a non-conductive line having a distal end that is connected to the conductive plug opposite the conductive wire; and wherein the non-conductive line, the conductive plug, and the conductive wire are configured to be wound around a fuselage-mounted spool such that, when the fuselage is in flight, the non-conductive line, the conductive plug, and the conductive wire may be unspooled with the conductive wire passing through the narrow opening until the conductive plug comes into contact, and forms an electrical connection, with the conductive socket thereby forming a trailing wire antenna.

10. The trailing wire connector of claim 9, wherein the conductive socket is funnel-shaped.

11. The trailing wire connector of claim 9, wherein the conductive socket has the shape of a truncated cone.

12. The trailing wire connector of claim 9, wherein the spool is mounted within the fuselage.

13. The trailing wire connector of claim 12, further comprising a drogue chute attached to the distal end of the conductive wire.

14. The trailing wire connector of claim 13, further comprising a weight attached to the distal end of the conductive wire.

15. The trailing wire connector of claim 9, wherein the feed line is a center conductor of an RF coaxial cable and the fuselage is electrically connected to a conductive shield of the RF coaxial cable.

16. A method for providing a trailing wire connector comprising:

mounting to a fuselage of a UAV a conductive socket having an opening therein;

electrically insulating the conductive socket from the fuselage;

electrically connecting the conductive socket to a feed line of an RF cable;

electrically connecting a metal shield of the RF cable to the fuselage;

winding a trailing line around a spool and mounting the spool to the fuselage, wherein the trailing line comprises a non-conductive line segment separated from a conductive wire segment by a conductive plug, and wherein the conductive plug is electrically and physically connected to a proximal end of the conductive wire and sized to not fit through the opening of the conductive socket; and when the fuselage is airborne, unspooling the trailing line through the opening of the conductive socket until the conductive plug comes into contact with the conductive socket creating an electrical connection between the conductive socket and the conductive plug thereby forming a trailing wire antenna.

17. The method for providing a trailing wire connector of claim 16, further comprising rewinding the trailing line around the spool to retract the trailing wire prior to landing.

18. The method for providing a trailing wire connector of claim 16, further comprising catching the UAV when airborne by grasping the trailing wire antenna.

19. The method of claim 16, wherein the UAV is selected from a group consisting of a fixed-wing UAV, a quad-copter, and an Earth-orbiting satellite.

20. The method of claim 17, further comprising using an antenna tuner to adjust an operating frequency of the trailing wire antenna.

* * * * *